United States Patent Office 3,850,871
Patented Nov. 26, 1974

3,850,871
ACRYLIC ORGANOSOL COATING COMPOSITION CONTAINING A PLASTICIZER OF A DIBASIC ACID/GLYCOL/MONOBASIC ACID PLASTICIZER
Aloysius N. Walus, Flint, Mich., assignor to E. I. du Pont de Nemours and Company, Wilmington, Del.
No Drawing. Continuation-in-part of abandoned application Ser. No. 31,764, Apr. 24, 1970. This application Sept. 18, 1972, Ser. No. 290,138
Int. Cl. C08f 45/36
U.S. Cl. 260—31.6          4 Claims

ABSTRACT OF THE DISCLOSURE

An improved acrylic organosol coating composition containing a plasticizer of an esterification product of an aliphatic dibasic acid such as adipic acid, a glycol such as neopentyl glycol, and a monobasic acid such as benzoic acid in preferred proportions so that the composition has a low hydroxyl number.

CROSS-REFERENCE TO RELATED APPLICATIONS

This application is a continuation-in-part of my co-pending application Ser. No. 31,764, filed Apr. 24, 1970, now abandoned.

BACKGROUND OF THE INVENTION

Plasticizers have been used for many years in coating compositions. There are many property requirements that a plasticizer must meet in order to be suitable coating compositions such as low volatility, durability, compatibility with the polymeric material, and others which contribute to stain resistance and good flow character.

The plasticizer of this invention combines many of the desirable properties required for a plasticizer used in automotive coating compositions. This plasticizer when used in an automotive acrylic organosol coating composition provides an aesthetically acceptable finish having good physical properties both during and after baking of the composition (good reflow and crack resistance, respectively).

Desired amounts of a dibasic acid, a glycol, and a monobasic acid are reacted to yield a plasticizer having a low hydroxyl number. It has been discovered that this plasticizer provides an extremely good plasticizing effect on acrylic organosol paint systems.

SUMMARY OF THE INVENTION

The improved acrylic organosol coating composition of this invention contains 10–60% by weight, of a film-forming graft copolymer dispersed in an organic liquid wherein the graft copolymer comprises A backbone (A) and one or more side chains (B), the backbone (A) being a polymeric segment of units (a) and up to 15% by weight of units (b), said (b) units providing available active grafting sites for graft polymerization, and each side chain (B) above being a polymeric segment, (A) and (B) being different from each other, and (a) and (B) each being composed of at least 50% by weight of units of esters of acrylic, methacrylic and/or ethacrylic acid, provided that such that either (A) or (B) if prepared as a separate polymeric entity, is substantially soluble in said organic liquid, whereas, the other of (A) or (B), if prepared as a separate polymeric entity, is substantially insoluble in the same organic liquid;

The improvement used therewith comprises 1–28% by weight, based on the total weight of the coating composition, of a plasticizer which is the esterification product of 20 to 48 mole percent of an aliphatic dibasic acid which is either adipic acid, succinic acid, malonic acid, glutaric acid, sebacic acid or azelaic acid;

40 to 50 mole percent of a glycol which is either neopentyl glycol, ethylene glycol or 2,2-dimethyl-3-hydroxypropyl-2,2-dimethyl-3-hydroxy-propionate; and 5 to 35 mole percent of a monobasic acid which is either benzoic acid, para-tertiarybutyl benzoic acid or pelargonic acid;

wherein the plasticizer has a hydroxyl number of not greater than 40.

DESCRIPTION OF THE INVENTION

The plasticizer of this invention is an esterification product of an aliphatic dibasic acid, a glycol, and a monobasic acid. The proportion of each ingredient is important as the proper balance will allow the hydroxyl number of the end product (plasticizer) to be low. It has been found that the lower the hydroxyl number, the lower the water sensitivity of the product. Any water produced during this reaction is removed from the product to yield the aforementioned plasticizer.

The aliphatic dibasic acid should form from about 20 to about 48 mole percent of the esterification product. Illustrative of such dibasic acids are adipic acid, succinic acid, malonic acid, glutaric acid, sebacic acid and azelaic acid. Adipic acid in an amount of about 30 to 35 mole percent is the preferred dibasic acid component of the plasticizer.

Glycols should form from about 40 to 50 mole percent of the esterification product. Illustrative of desirable glycols are neopentyl glycol, ethylene glycol, and 2,2-dimethyl - 3 - hydroxypropyl - 2,2 - dimethyl - 3 - hydroxypropionate. Neopentyl glycol in an amount of about 43 to 48 mole percent is preferred.

The monobasic acid should form from about 5 to 35 mole percent of the esterification product. Illustrative of such monobasic acids are benzoic acid, para-terbutyl benzoic acid and pelargonic acid. Benzoic acid in an amount of about 20 to 25 mole percent is preferred.

In order to obtain said esterification product having the aforementioned mole percents of monobasic acid, glycol, and dibasic acid, the esterification reaction should be carried to completion. The mixture of the aforementioned acids and glycol before reaction, should be comprised of about the same mole percents as the esterification product. However, due to the possible inefficiency of some reaction systems, slight additions may be made to compensate for materials lost in the reaction process.

The selection of the specific dibasic acid, glycol, and monobasic acid and amounts thereof, should be made so as to keep the hydroxyl number of the plasticizer not greater than 40. A hydroxyl number not greater than about 6 is preferred.

In order that this plasticizer can contribute significantly to the properties of the acrylic organosol finish, it should be present in amounts ranging from 1% to 28% by weight of the total coating composition with 20% to 22% being preferred.

The acrylic organosol composition used in this invention has a film-forming polymer solids content of about 10–60% by weight, and preferably, 20–40% by weight. The film-forming polymer is a graft copolymer represented by the recurring structural unit A–B, where A is the backbone segment of the molecule and B is the graft segment attached to a chemical bond.

The A portion of the graft copolymer can be further represented by an a–b structure, i.e., the backbone is a copolymer composed of monomer units (a) and monomer units (b), where the (a) portion, i.e., the (a) monomer units, of the A segment is composed of monomer units from monomers of the general structure:

Formula (1)

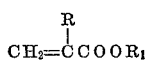

where
R is H, $CH_3$ or $-CH_2CH_3$, and
$R_1$ is an alkyl or cycloalkyl group of 1 through 18 carbon atoms.

These monomers are esters of acrylic acid, methacrylic acid and ethacrylic acid, lower alkyl methacrylates, where the alkyl group had 1–10 carbons being preferred with alkyls of 1–4 carbons, such as methyl methacrylate being especially preferred.

The (a) portion should constitute at least 85% by weight of the total A segment.

Although ordinarily the (a) portion will be composed entirely of the units referred to above, up to about 50% of its weight can consist of other monomers which do not contribute active grafting sites to the backbone. Illustrative of these are acrylic acid, methacrylic acid and their amides and nitriles such as acrylonitrile and methacrylonitrile; vinyl acetate; styrene; α-methyl styrene; vinyl toluene, 3 - (2 - methacryloxyethyl)-2,2-spirocyclohexyloxazolidine, and the like.

The (b) portion, i.e., the monomer units (b), of the A backbone segment provides the potential active grafting sites, i.e., points for attachment for the B branch segment or segments.

The (b) portion of the A segment, which comprises up to 15%, preferably 0.2–5%, even more preferably, 0.4–3%, by weight of the total A segment, can be any monomer units that provide available active grafting sites for graft polymerization. Representative of useful grafting site monomer units are those having the following general formula Formula (2)

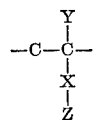

where
X can be

(the carbon atom in this group being attached directly to the backbone),

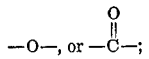

Y can be hydrogen, $-CH_3$ or $-CH_2CH_3$;
Z can be

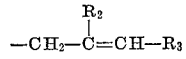

where $R_2$ and $R_3$ are Y

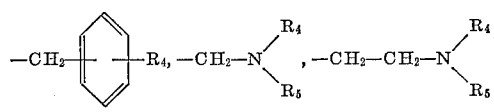

where
$R_4$ and $R_5$ are H or alkyl of 1 through 4 carbon atoms, or
$-CH_2-CH_2-O-R_6$
where $R_6$ is alkyl of 1 through 4 carbon atoms,

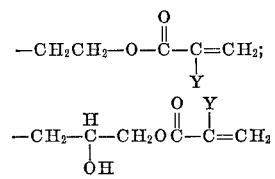

where Y has the same meaning as above;

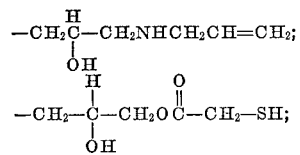

or

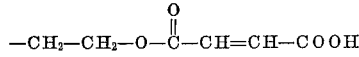

provided that when
X is

Z can be $-H$ or $-NH-CH_2-CH=CH_2$ and provided further that the combined $-X-Z$ group can be

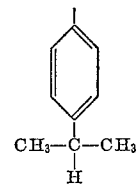

Allyl methacrylate and diethylaminoethyl methacrylate are preferred.

The B segment is the branch segment or branch segments of the graft copolymer. Like the (a) portion of the polymeric backbone segment A, the B segment of the graft copolymer molecule is composed of monomer units from monomers of the general structure of Formula (1) above.

As in the case of the (a) portion, the B portion of the graft copolymer molecule will ordinarily be composed entirely of acrylic units as mentioned above. However, up to about 50% by weight of the B portion can consist of other monomers which do not contribute active grafting sites to the backbone. Illustrative of these are acrylic acid, methacrylic acid and their amides and nitriles such as acrylonitrile and methacrylonitrile; vinyl acetate; styrene; α-methyl styrene; vinyl toluene; 3-(2-methacryloxyethyl)-2-spirocyclohexyl-oxazolidine, and the like.

Especially preferred B segments are composed of 2-ethylhexyl acrylate units, butyl acrylate units, or combinations of the two.

The B portion of the graft copolymer is always the branch segment and will not contain any significant amount of a component which provides active grafting sites such as previously indicated by (b).

As will readily be understood by persons in this art, preparation of graft copolymers described above will typically result in a mixture of polymer molecules, of varying number of grafted side chains per molecule. The average number of grafted B segments per A or backbone segment is ordinarily 0.5–5, preferably 1–2.

Although the backbone or A segment can be composed of the same general polymeric structure as the branch or B segment except for the (b) portion of A, the selection of the particular monomers used in the A and B segments of the graft copolymer should be such that either A or B, if prepared as a separate polymeric entity, is substantially soluble in the organic medium of the organosol, whereas, the other of A and B, if prepared as a separate polymeric entity, is substantially insoluble in the same organic medium. Therefore, in all instances, the backbone including grafting sites or (b) portion, must exhibit a distinct contrast in solubility with the branch segment. Thus, the organosol may have a soluble backbone and an insoluble graft or an insoluble backbone and a soluble graft for any given organic medium.

A segment is substantially soluble in a particular organic medium when, added as a separate polymeric entity, it will form a clear solution in this particular medium. A segment is substantially insoluble when, added as a separate polymeric entity, it will not form a clear solution in the organic medium irrespecive of how much solvent is added.

Proper solubility parameter balance between the soluble and soluble segment of the graft copolymer used is important. To achieve maximum stability, the solubility parameter of the insoluble segment (determined as an entity) should differ from that of the soluble segment (determined as an entity). The solubility parameter of the soluble segment and continuous phase (everything in a liquid state) should be similar to achieve maximum stability.

It should be noted that solubility parameter of the soluble or insoluble segment taken as an entity is a single value. This value is obtained as a result of a simple algebraic relationship based on the solubility parameter of the monomers which form the polymeric entity and the ratio of the monomers to the total monomeric composition of the entity.[1]

A solubility parameter gradient between the insoluble segment of the graft copolymer and the soluble segment or continuous phase should be at least plus or minus 0.5 parameter unit, for an acceptable dispersion stability, preferably at least plus or minus 1.0 unit. A solubility parameter difference of less than 0.2 unit will lead to dispersions of markedly reduced stability.

The insoluble segment comprises from 20–95% by weight of the total A–B graft copolymer, preferably 65–90%. It will have a number average molecular weight of 10,000–450,000. Particular advantages are obtained, especially when the organosol is used as a coating composition, when the insoluble segment is at least about 50% by weight of the total graft copolymer. Best results in automotive finish applications are obtained when the insoluble segment is at least about 70% by weight of the total graft copolymer.

The soluble segment ordinarily constitutes from 5–80% by weight of the total graft copolymer, preferably 10–35%. The number average molecular weight of the soluble segment ranges from about 2,000–50,000.

The preparation of the graft copolymers of the organosol is accomplished by polymerizing the monomer of the graft copolymer in a good solvent, i.e., one in which both the individual backbone and graft segments and subsequent graft copolymers formed therefrom are soluble. Illustrative of such solvents which form a solution of the graft copolymer or segments thereof are esters, ketones and aromatic hydrocarbons, preferred good solvents are methyl ethyl ketone, xylene, toluene, ethylene glycol monomethyl ether, ethylene glycol monoethyl ether acetate, diethylene glycol monobutyl ether, dimethyl phthalate, diethyl phthalate, diethyl adipate, hexalene glycol diacetate, ethylene glycol diacetone and diacetone alcohol.

In order to convert the graft copolymer solution to an organosol, an organic liquid of such solvency is added so that the resulting solvent mixture becomes a nonsolvent or poor solvent for one of the segments of the graft copolymer but remains a solvent for the other segment.

This effectuates the conversion and produces the desired dispersion. Illustrative of such poor solvents are aliphatic hydrocarbons such as pentane, hexane, VM and P naphtha, petroleum ethers, aliphatic alcohols such as ethanol and propanol, Isopar-E, mineral spirits, dibutyl carbitol, butyl cellosolve, and mixtures of these.

This partial solubility of the graft copolymer macromolecule produces the self-stabilization of the organosol. This does not preclude the use of external or other stabilizers, particularly when one operates close to the edge or self-stabilization of the system.

Preferably, the acrylic organosol is applied by spraying. In order to apply the film-forming graft copolymer to a substrate in a dual solvency system, the system can be prepared by the addition of suitable solvents which cause the organosol system to contain at least one poor solvent and at least one good solvent for the film-forming polymer as a whole.

The poor solvent or poor solvent mixture as a whole should be more volatile than the good solvent or good solvent mixture as a whole and will ordinarily have a mean boiling point (determined from its boiling range) falling within the limits of about 30° C. through 220° C., preferably 60–200° C.

The good solvent or good solvent mixture as a whole for the film former should be less volatile than the poor solvent or poor solvent mixture as a whole and should have a mean boiling point within the limits of about 50° C. through 350° C., preferably 80–320° C.

For optimum spray application, the weight ratio of good solvent to poor solvent should be 40/60 to 70/30. There should be present in the solvent blend an amount of a good solvent component equal to about 25–200% of the weight of total film-forming polymer present, which good solvent component has a weight average boiling point at least about 10° C. higher than the mean boiling point of the poor solvent component having the highest boiling range, i.e., the poor solvent component which has the highest dry point.

The graft polymer particles in the acrylic organosol average from 0.05 micron to about 2 microns in diameter. The organosols are stable against settling and can remain in storage for extended periods without caking, flocculating or coagulating.

The graft copolymers used as film-formers in the acrylic organosols can be made by first preparing the A segment, the backbone. This is done by conventionally copolymerizing the (a) portion with the (b) portion. Suitable amounts of appropriate monomers are mixed together in an organic liquid in which the resulting backbone will be soluble, such as esters, ketones or aromatic hydrocarbons, together with from 0.1–2% by weight of a free radical polymerization initiator such as benzoyl peroxide, azobisisobutyronitrile or the like.

This mixture is then brought to the reaction temperature and maintained at this temperature unil polymerization is 75–95% complete.

To the reaction mixture in one or more portions, appropriate amounts of the grafting monomer(s) and from 0.1–2% of a graft initiator such as t.-butyl peroxypivalate, t.-butyl peracetate, or benzoyl peroxide are then added. The reaction mixture is brought to its reflux temperature and held at this temperature until 90% conversion to the graft copolymer is obtained. This is determined by analysis for unreacted monomers.

Optionally, at this point, further addition of monomers can be made if desired for further polymerization with the graft copolymer or with any other monomeric or polymeric materials that may be present. Preferably, such monomers will be from the group of monomers used in formation of the non-grafting-site portion of the backbone. Most preferably, monomeric methyl methacrylate can be used at this stage.

Optionally, solutions of preformed compatible polymers be added at this time to the reaction mass. For example, polymethyl methacrylate, cellulose esters such as cellulose acetate butyrate, polyvinyl acetate, etc., or mixtures thereof can be added.

---

[1] Solubility parameter of a substance $$= \sqrt{\frac{(\text{Heat of Vaporization}) \times (\text{density})}{\text{Molecular Weight}}}$$

Since the heat vaporization is a factor directly influencing the solubility parameter value, the solubility parameter is a value which is absolute and takes into account all the physical forces acting on any specific polymer.

The resulting reaction product is made into a stabilized organosol by the addition of a poor solvent (as previously defined) for the graft copolymer can be used directly to prepare coating compositions.

Two preferred graft copolymers utilized in the acrylic organosol have the following composition: a backbone of methyl methacrylate/allylacrylate and diethylaminoethyl acrylate having a graft side chain of 2-ethylhexyl acrylate wherein the constituents are in the following weight ratio: methyl methacrylate 82.8%, 2-ethylhexyl acrylate 15.8%, diethylaminoethyl methacrylate 0.8%, allyl methacrylate 0.6%; another particularly useful copolymer is methyl methacrylate, isodecyl methacrylate, allyl methacrylate and methacrylic acid, and has a side chain attached to allyl methacrylate of acrylonitrile, the constituents have the following weight ratio: methyl methacrylate 80.2%, acrylonitrile 8.9%, isodecyl methacrylate 9.8%, allyl methacrylate 1.0%, methacrylic acid 0.1%.

UTILITY

The plasticizers formulated according to the invention possess very good plasticizing properties and are compatible with the aforementioned acrylic organosol composition. The plasticizer is of low volatility and contributes to good reflow on heat treatment such as baking.

This plasticizer can also be used in most conventional coating compositions such as solution lacquers, other organosol finishes, and alkyd finishes. The plasticizer could also be used in combination with other external plasticizers such as modified coconut oil to give a good plasticizing effect.

The following Example illustrates the invention.

Example

In order to make 100 gallons of plasticizer:

(1) 403.4 lbs. of water based 90% neopentyl glycol, 377.5 lbs. of adipic acid, 199.7 lbs. of benzoic acid, 0.6 lb. of dibutyl tin oxide, and 25.2 lbs. of toluene were added to a kettle.

(2) The mixture of step (1) was heated until all the ingredients formed a clear liquid (about 210° F.). Heat was then added to allow the temperature of the mixture to gradually increase so that reflux starts (about 260° F.) and water is given off.

(3) Heating was continued until the temperature reached about 490° F. and no more water was given off and the composition had an acid number of less than 3.

(4) The addition of heat to the mixture of step (3) was stopped and 65.3 lbs. of toluene added to thin the mixture to 90% total solids.

This process produced a plasticizer with a hydroxyl number of below 5 which had excellent properties when used in conventional paint systems.

An acrylic organosol is prepared according to the following steps:

(1) 850.0 parts of methyl methacrylate, 7.0 parts of allyl methyacrylate, 135.0 parts of toluene, and 210.0 parts of methyl ethyl ketone are mixed and heated to 90° C.;

(2) a mixture of 43.0 parts of methylethyl ketone and 3.3 parts of azobisisobutyronitrile is then added, the reaction mixture is heated to reflux and held at reflux for 17 minutes;

(3) a mixture of 1.2 parts azobisisobutyronitrile, 300.0 parts of methylethyl ketone, and 40.0 parts of toluene is then added over an 80-minute period;

(4) then a mixture of 140.0 parts of 2-ethylhexyl acrylate, 0.6 part azobisisobutyronitrile, and 0.6 part t.-butyl peroxypivalate is added and the reaction mixture is brought to reflux and held at reflux for 10 minutes;

(5) next, a mixture of 50.0 parts 2-ethylhexyl acrylate and 2.0 parts t.-butyl peroxypivalate is added over a 30-minute period followed by a 30-minute waiting period;

(6) 240.0 parts of Isopar-E (a high purity isoparaffinic odorless solvent), an isoparaffin boiling between 115–142° C., are mixed with 2.0 parts of t.-butyl peroxypivalate and this mixture is added to the reaction mixture over a 30-minute period, followed by a 30-minute waiting period.

(7) 650.0 parts of Isopar-E are added to the reaction mixture over a 20-minute period and the reaction mass allowed to cool. The result is an organosol having 38.6% solids of a dispersed graft copolymer having a methyl methacrylate alkyl methacrylate backbone and a poly-2-ethylhexyl acrylate graft segment.

A pigmented acrylic organosol lacquer is then prepared as follows:

A pigment base is prepared by mixing 5.0 parts of ethylene glycol diacetate, 40.15 parts of ethylene glycol monoethyl ether acetate, 11.81 parts of isopropanol, 9.9 parts of methylethyl ketone, 18.6 parts of xylene, 44.48 parts of toluene, 50.0 parts of $TiO_2$, 8.0 parts of Indofast Yellow Greenish Toner, 6.0 parts of carbon black, 35.0 parts of iron oxide, and 161.06 parts of the solution form of the organosol prepared above. The resulting paste is sand ground in a standard sand mill to a 0.1 mil fineness;

22.0 parts of the above prepared plasticizer is added to the pigment base and mixed for 5 minutes;

185.1 parts of the above organosol is added and the mixture stirred for 5 minutes and is followed by addition of 5.98 parts of VM and P naphtha, 8.70 parts of hexane, and 4.02 parts of toluene and the resulting reaction mixture is blended for 30 minutes, which produces a yellow pigmented acrylic organosol lacquer.

This yellow pigmented lacquer is reduced to a spray viscosity by adding 108.80 parts of ethylene glycol monobutyl ether acetate, 16.48 parts of ethylene glycol diacetate, and 74.72 parts of VM and P naphtha to 296 parts of the acrylic lacquer. The above prepared lacquer is sprayed onto a steel panel having an alkyd resin primer coating and a sealer coat. The panel is baked for about 30 minutes at 165° C. and results in a hard film about 1.8 mils thick which in each case has excellent adhesion to the sealer coating and has a high gloss, excellent hardness, is resistant to blistering by high humidity, has excellent resistance to water soaking, is highly chip resistant and is resistant to deterioration by weathering.

The invention claimed is:

1. An acrylic organosol coating composition consisting essentially of:

about 10–60% by weight of film-forming constituents dispersed in organic liquid wherein the film-forming constituents consist essentially of a graft copolymer comprising a backbone (A) and one or more side chains (B), the backbone (A) being a polymeric segment of units (a) and up to 15% by weight of units (b), said (b) units providing available active grafting sites for graft polymerization, and each side chain (B) above being a polymeric segment, (A) and (B) being different from each other, and (a) and (b) each being composed of at least 50% by weight of units of esters of acrylic, methacrylic acid and/or ethacrylic acid, provided that such that either (A) or (B) if prepared as a separate polymeric entity, is substantially soluble in said organic liquid, whereas, the other of (A) or (B), if prepared as a separate polymeric entity, is substantially insoluble in the same organic liquid; wherein the (a) monomer units of the (A) segment consist of methyl methacrylate and the (b) monomer units of the (A) segment consist of allyl methacrylate and the monomer units of the (B) segment are selected from the group consisting of 2-ethylhexyl acrylate or acrylonitrile; and 1–28% by weight, based on the total weight of the coating composition, of a plasticizer consisting of the esterification product of about 30 to 35 mole percent adipic acid, about 43 to 48 mole percent of neopentyl glycol and about 20 to 25 mole percent of benzoic acid, wherein the plasticizer has a hydroxyl number of not greater than 40.

2. The acrylic organosol coating composition of Claim 1 wherein the hydroxyl number of the plasticizer is not greater than 6.

3. The acrylic organosol coating composition of Claim 2 in which the graft copolymer of the acrylic organosol composition (a) monomer units of the (A) segment consist of methyl methacrylate; and (b) monomer units of (A) segment consist of allyl methacrylate and diethylaminoethyl methacrylate and the monomer units of (B) segment consists of 2-ethylhexyl acrylate.

4. The acrylic organosol coating composition of Claim 2 in which the graft copolymer of the acrylic organosol composition (a) monomer units of the (A) segment consist of methyl methacrylate, methacrylic acid, and (b) monomer units of the (A) segment consist of allyl methacrylate and monomer units of the (B) segment consist of acrylonitrile.

References Cited
UNITED STATES PATENTS

| | | | |
|---|---|---|---|
| 3,261,788 | 7/1966 | Carter et al. | 260—33.6 R |
| 3,405,087 | 10/1968 | Fryd | 260—33.6 UA |
| 3,607,821 | 9/1971 | Clocke et al. | 260—33.6 UA |
| 3,660,537 | 5/1972 | Fryd et al. | 260—885 |

MORRIS LIEBMAN, Primary Examiner

S. M. PERSON, Assistant Examiner

U.S. Cl. X.R.

260—476